Figure 1:
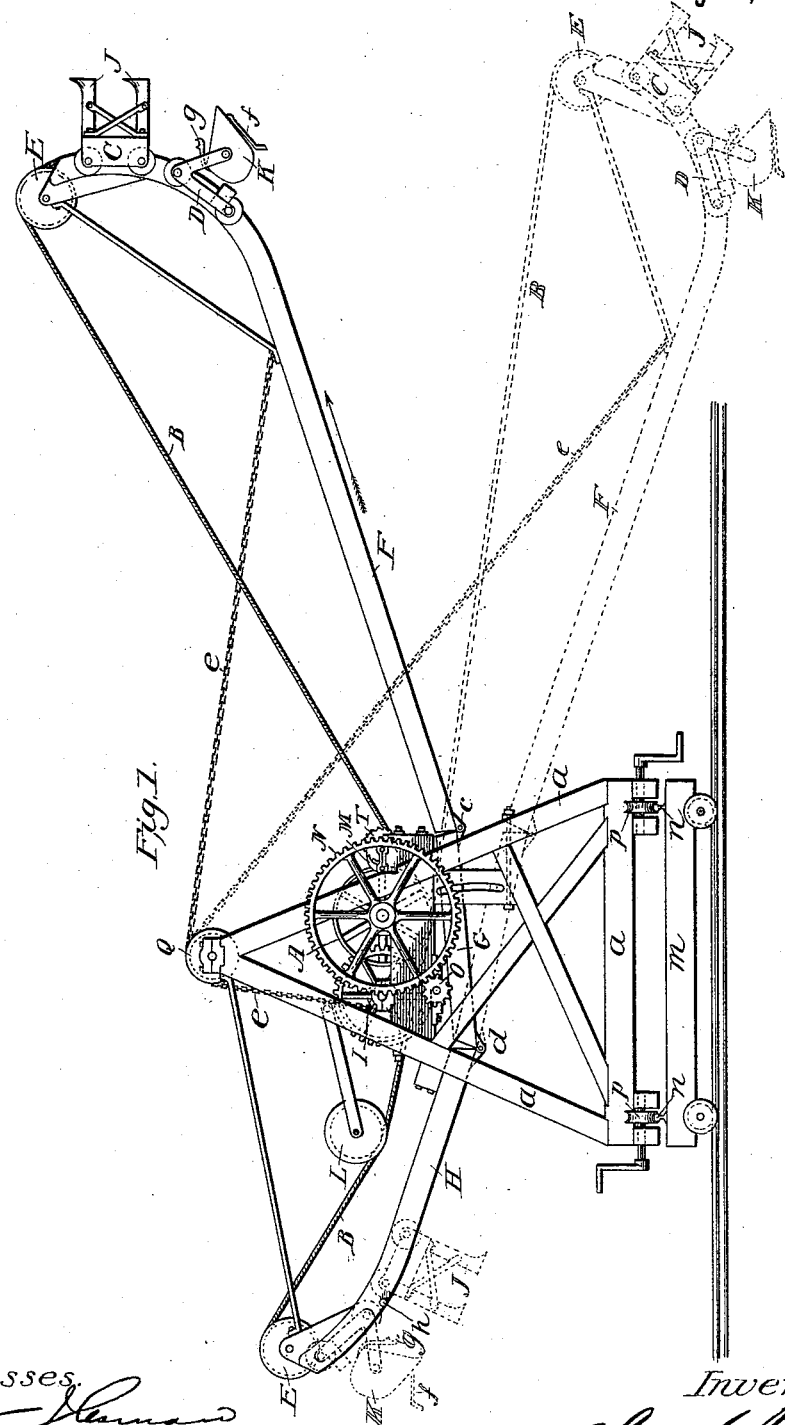

(No Model.) 4 Sheets—Sheet 1.
C. R. SCOLES.
EXCAVATING MACHINE.

No. 542,375. Patented July 9, 1895.

Witnesses. Inventor.

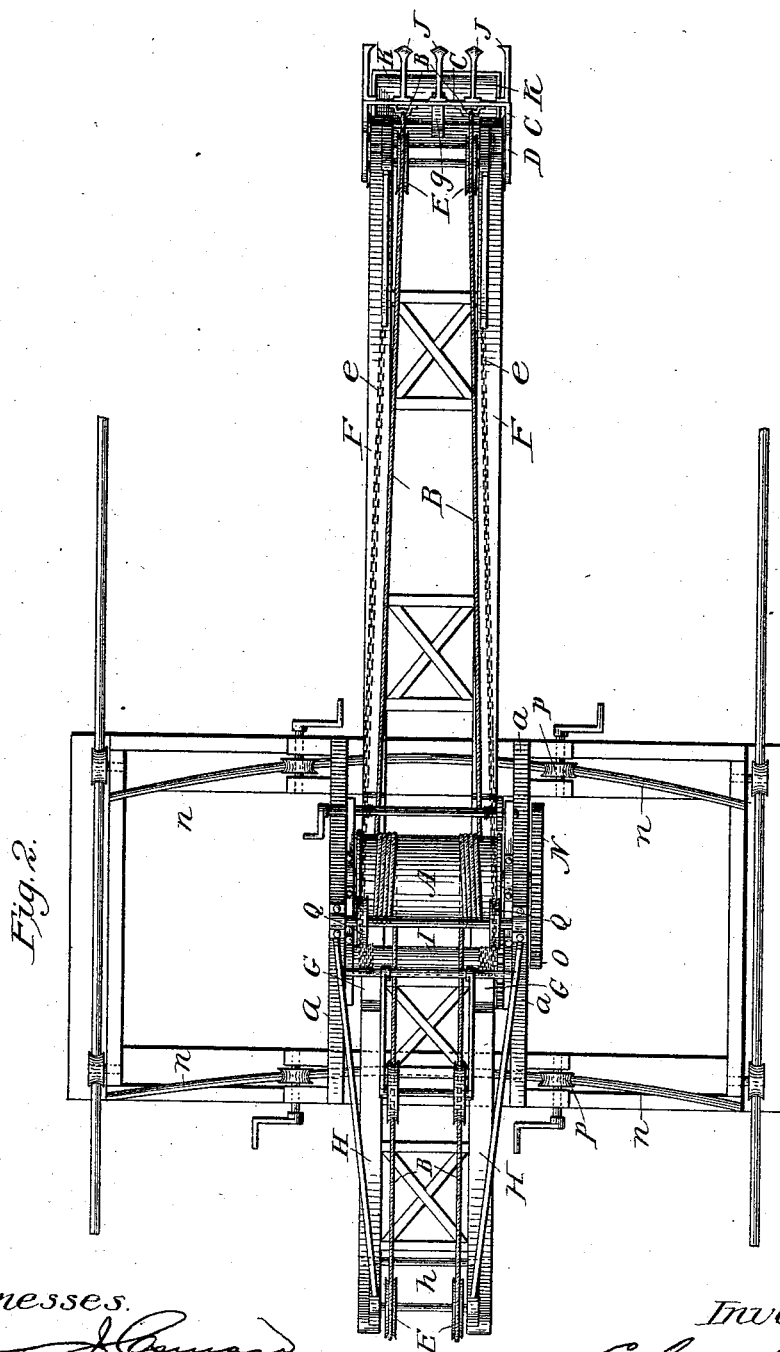

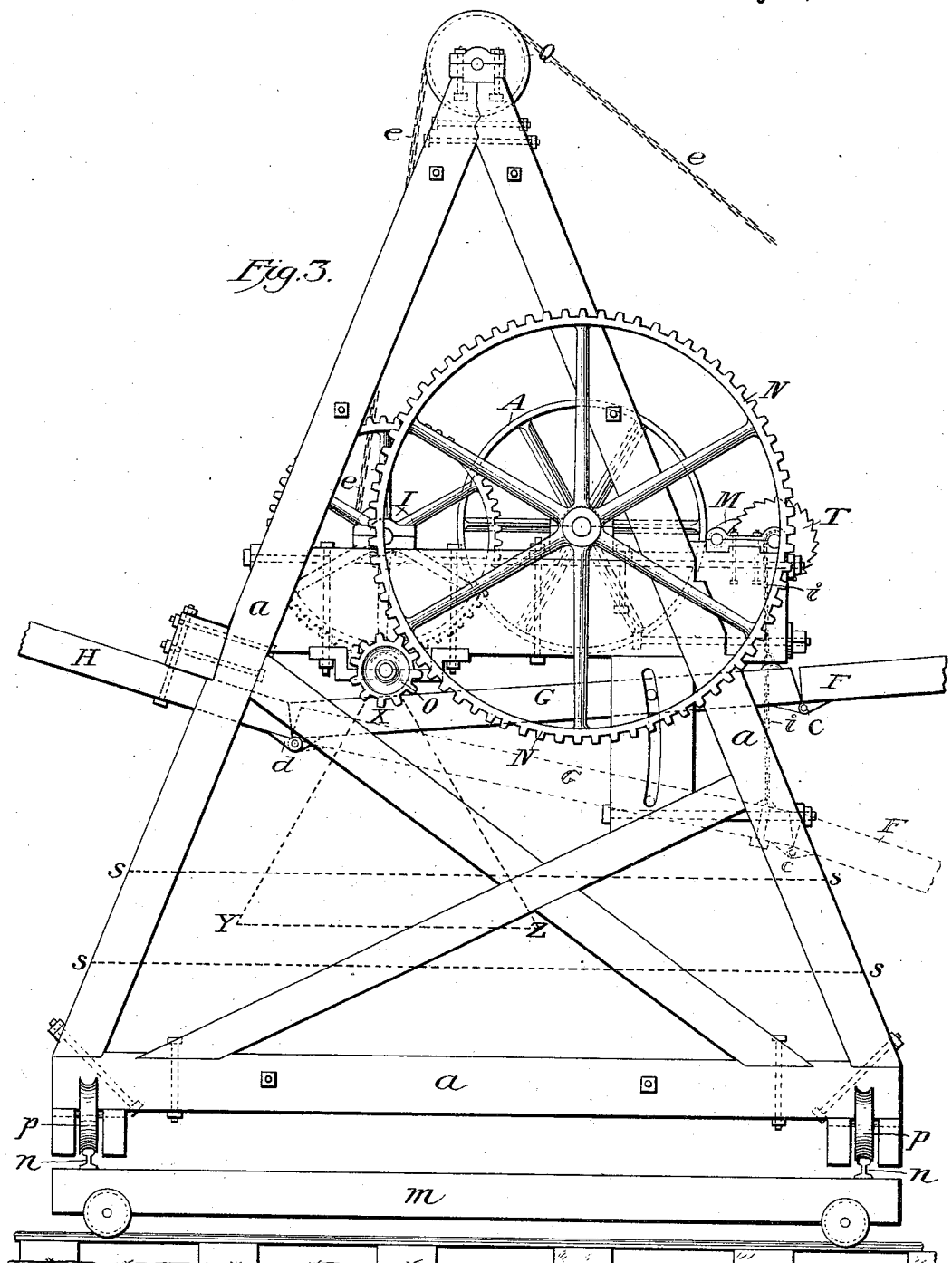

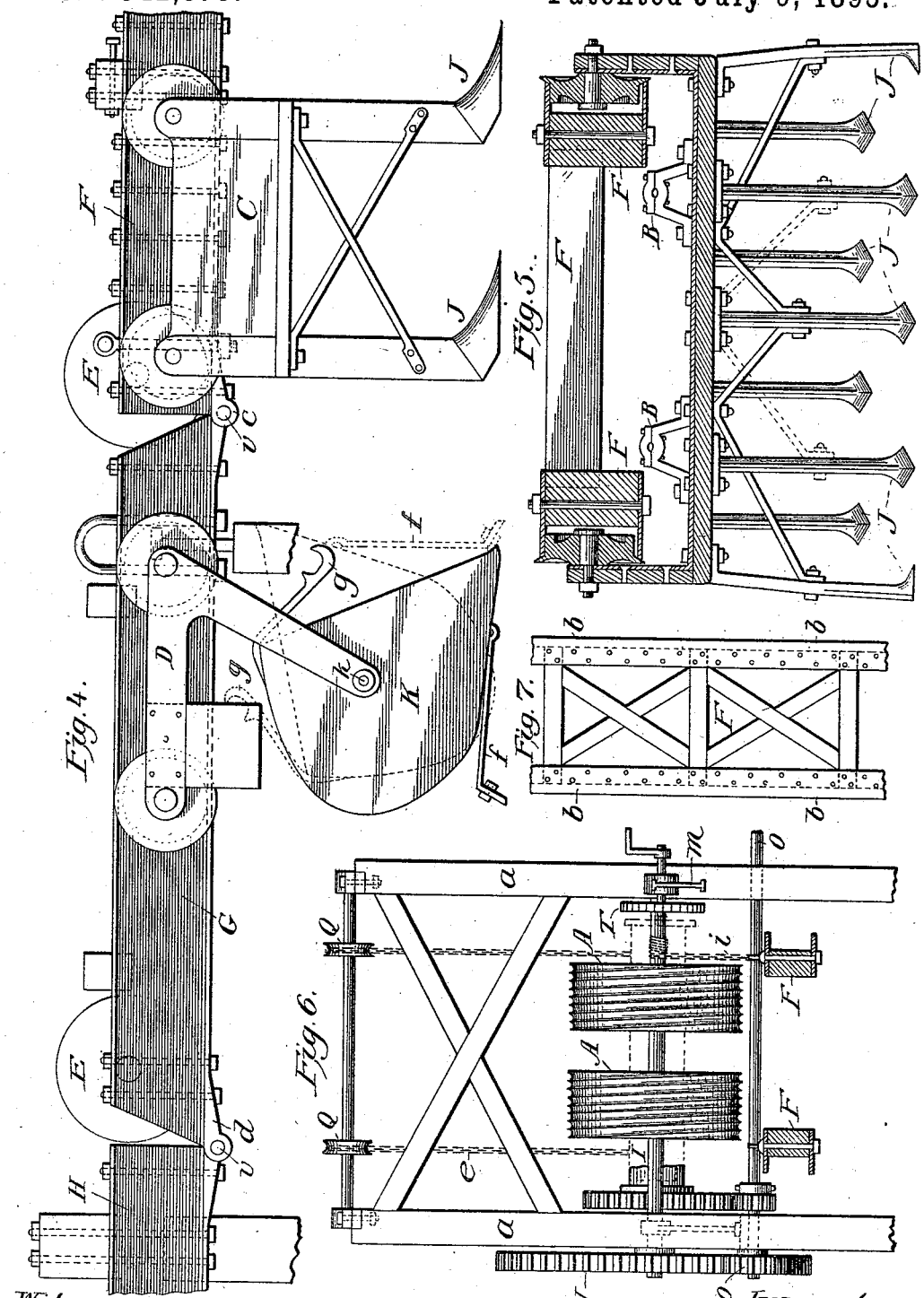

UNITED STATES PATENT OFFICE.

CHARLES R. SCOLES, OF HILLSBOROUGH, CANADA.

EXCAVATING-MACHINE.

SPECIFICATION forming part of Letters Patent No. 542,375, dated July 9, 1895.

Application filed April 20, 1894. Serial No. 508,352. (No model.)

*To all whom it may concern:*

Be it known that I, CHARLES R. SCOLES, of the parish of Hillsborough, in the county of Albert, in the Province of New Brunswick, in the Dominion of Canada, have invented a certain Machine for Excavating Purposes; and I do hereby declare that the following is a full, clear, and exact description of the same, reference being made to the accompanying drawings, in which—

Figure 1 is a general view of side elevation of machine. Fig. 2 is a plan of the same; Fig. 3, side elevation showing details; Fig. 4, details of arms, tracks, hinges, plows, and shovel; Fig. 5, details, plows, track-frame, and method of attaching wire rope; Fig. 6, details, drums, gears, and raising and lowering tracks; Fig. 7, construction of arms.

The invention consists of a self-acting filling and dumping shovel and a series of plows acting in combination therewith and running on and guided by tracks on an adjustable arm, said arm being hinged and capable of being elevated or depressed at any angle to suit the nature of excavation, said track on the adjustable arm being extended through and to the rear of the machine to such a length and height as to allow the shovel to automatically discharge its contents into carts, cars, or hoppers or any conveyer provided, the whole being mounted upon a lower and an upper platform capable of having a longitudinal and a transverse movement, the object of the machine being for the excavation of earth, gravel, mud, and similar substances in large quantities and for general excavating purposes of all description.

In the drawings, *a a* represent the frame of the machine, which is strongly made of wood and iron, all joints and fastenings being made with screw-bolts, so as to allow of the machine being taken to pieces for purposes of transportation, the machine being made strong enough to resist vibration of the operating parts. While the drawings attached give the exact style of frame herein described, yet it can be altered and modified to suit circumstances and conditions, and as I claim no novelty or no protection for style of frame I wish it understood that I do not bind myself to the style of it as hereinbefore shown.

A is a winding-drum on which the endless wire ropes B B are wound, said ropes B running over and under pulleys E E E E and being fastened to truck-frames C and D in manner shown in Fig. 5, each fastening on the truck-frame being in the nature of a clutch, allowing wear and strain to be easily taken up by tightening of same.

Although an endless wire rope is used in this machine for ordinary work, yet for some purposes in heavy material endless chains carried over sprocket-wheels instead of pulleys could be used and would work just as easily under the same fastenings and on the same drum as the wire ropes.

Winding-drum A has attached to its shaft a large gear-wheel N, which engages with a pinion on engine-shaft O, engines being of the usual type of double-cylinder hoisting-engines and placed together on a bed-piece, which is firmly bolted and secured to side of machine, as outlined in Fig. 3 by the dotted lines S S S S, representing when the engines (represented by dotted triangle X Y Z) are bolted on to the frame, the cylinders of the engines being placed at angles similar to dotted triangle in drawings, although other motive power of varying styles are easily adapted and may be used by me in my machine as I may think fit.

The endless wire ropes B B are attached to the truck-frame of C, carrying the gang of plows, and D, carrying the shovel, and upon motion being imparted to drum by the gear-wheel O N the trucks C and D are hauled backward or forward, as desired, over the tracks on the arms to the extreme limit of either end of machine, as shown in Fig. 1.

F is an adjustable arm, raised and lowered by chains *e e*, chains being fastened to the arm F at a suitable point and carried over pulley or sprocket wheel Q to a winding-drum I, which is operated by a shifting-gear on engine-shaft, allowing arm F to be raised or lowered to any degree by the engines working machine.

Arm F is hinged at *c* or at any other suitable point to a second adjustable arm G, which is also raised and lowered, but not to the extent that arm F is. For the purposes of keeping arm G steady and firm it is raised and lowered in a slot R by chains *i i* on winch T, where it is held by pawl M in whatever position is required. Although middle arm G is shown in drawings as being operated by hand, yet it can also easily be operated by the engines of machine by a small movable gear, and probably that will be the way in most cases in which it will be worked. Neither do I confine myself to this method of raising the center tracks, as there are many other ways equally applicable to the case. Arm G is again hinged at d or any suitable point to arm H, which is firmly fixed to the body of the machine in the manner shown.

The hinges by which the adjustable arms are joined together are of the usual type of strap-hinges, only made very strongly and forged to strapping of arms and bolted, as shown in Fig. 4, the steel pin v, holding hinges, being easily taken out when the arms are taken to pieces. The arms are not intended to be hinged at any fixed particular spot; but the hinges are so placed as to allow the wheels of the trucks C and D running over them in the easiest possible manner. All of these fixed and hinged arms are made of heavy timber or of iron. If timber, they are strapped on top and bottom with heavy iron plate projecting two and one-half inches outside of the arms, these two projecting plates forming the tracks in which the wheels carrying the trucks of C and D run, the wheels of the said trucks being flanges and the tread of the wheels fitting in between the projecting plates, as shown in Fig. 5.

Attached to truck-frame C are a number of plows J, the number and style of which are governed by the nature of material to be excavated. These plows are interchangeable by being bolted onto the truck-frame, as shown, and can be taken off by simply unscrewing the bolts. K is a shovel or receiver, made strongly of heavy boiler-plate or of steel. When hanging naturally on its truck-frame D, it is in position shown in Fig. 4. In that position it follows immediately behind the gang of plows and collects all the material loosened up by the plows. Fixed by a hinge to the bottom of K is a bar of iron f with a projecting end bolted on like a scraper. This drags behind the shovel while the shovel is being moved in a forward direction, but when motion is reversed and the shovel is attempted to be moved backward the scraper on the end of bar f catches in the ground and as movement backward proceeds gradually forces the shovel into the upright position indicated by dotted lines in Fig. 4. When it is exactly upright, a strong spring g, fixed to the back of the shovel, engages with a catch on the truck-frame and then holds it firmly in an upright position and so preventing the contents of the shovel from slipping out. In this position it is run back to the rear of the machine, when a bar h on Fig. 1 engages with the curved end of spring g, which releases the catch on the truck-frame, and the shovel immediately swivels on pin k, Fig. 4, discharging its contents and resuming the position ready for refilling. k is a strong steel pin, by which the shovel is fixed to its truck-frame, the pin being loose enough to throw the shovel to swivel on it when forced in an upright position by bar f.

m is a lower platform carrying two rails n, which are curved in obliquely parallel lines, on which the wheels p of the upper platform run in a transverse direction and directly at right angles to the direction that the wheels of the lower platform run, the lower platform being moved directly up to the face of the work to be accomplished and the main machine running backward and forward on the lower platform, the width of work done being determined by the length of lower platform. The object of the curved rails on the lower platform is to allow the end of the operating-arm to project outside of the straight line of the machine while working and so to excavate a passage wider than itself or to take off the slopes of a cutting.

The machine itself will either be propelled by steam by having a connection made from main engines, which is a very easy method to do and need not be particularly specified here, as it is an ordinary detail of machinery, or can be hauled by horses or in any other way deemed most suitable. The means of moving upper platform and machine in a transverse direction across the lower platform will be by a rack and pinion fixed on the lower platform and operated by a shaft from engines, or may be simply worked backward and forward by cranks turned by hand, fitted into the axles of wheels of upper platform, as shown in Fig. 2.

*Method of working.*—The machine being moved on the rails, as shown in plan, Fig. 2, into position for working, the adjustable arm F is raised or lowered to take depth of cut desired, generally two or three inches. Upon power being applied to drum A the plows and shovel are then moved forward in direction marked with an arrow in Fig. 1, the plows J so loosening up the soil in advance of the shovel until the shovel is filled. When the shovel is filled and the engine stopped and reversed in opposite direction, the scraper on bar b catches in the bottom of the cut and tilts the shovel into an upright position, where it is held by spring g. In this position it is run back to the rear of the machine until the curved end of spring g catches on bar h, which immediately releases spring g from the truck frame, and the shovel swivels on pin p, discharging its contents, and remains in position for refilling, and upon being moved forward keeps in the same position until motion is reversed again.

I make no claim for movable platforms, application of motive power, winches, or manner of general construction, for I am aware that these are not new; but

What I claim as my invention, and desire to secure by Letters Patent, is—

1. In an excavator a shovel K as described in drawings mounted on a truck frame D the body of shovel turning on pin $k$ so as to fill itself while following plows J J J J and having a bar $f$, hinged to it in the manner shown, bar $f$ having a plate attached to the free end of it which catches in the earth or substance to be excavated, upon shovel being moved backward, and so forces shovel K into an upright position shown, where it is held by catch on truck frame, all this substantially as set forth in specification and in manner hereinbefore shown.

2. In an excavating machine a set of double or single tracks carried on arms hinged or otherwise joined together, capable of being raised and lowered and attached to frame of machine in the manner hereinbefore described.

3. In an excavator the combination of adjustable tracks and gangs of plows attached to a truck frame the wheels of which run upon and are guided by the tracks and are followed by a receiver or shovel carried on a truck frame mounted on wheels, also guided by and running on same tracks on hinged adjustable arms, the plows, arms, and receiver, acting in combination for the purpose and in the manner hereinbefore set forth.

CHAS. R. SCOLES.

Witnesses:
CHAS. F. GROSS,
W. F. TAYLOR.